(12) United States Patent
Mamak et al.

(10) Patent No.: US 8,168,711 B2
(45) Date of Patent: May 1, 2012

(54) HEAT SHIELDING ADDITIVES

(75) Inventors: Marc Mamak, Maineville, OH (US);
Francesca Peri, Bologna (IT)

(73) Assignee: BASF SE Ludwigshafen (DE)

( * ) Notice: Subject to any disclaimer, the term of this patent is extended or adjusted under 35 U.S.C. 154(b) by 0 days.

(21) Appl. No.: 12/739,166

(22) PCT Filed: Oct. 23, 2008

(86) PCT No.: PCT/EP2008/064347
§ 371 (c)(1),
(2), (4) Date: Oct. 15, 2010

(87) PCT Pub. No.: WO2009/059901
PCT Pub. Date: May 14, 2009

(65) Prior Publication Data
US 2011/0024667 A1 Feb. 3, 2011

Related U.S. Application Data

(60) Provisional application No. 61/192,731, filed on Sep. 22, 2008.

(30) Foreign Application Priority Data

Nov. 5, 2007 (EP) .................................... 07119940

(51) Int. Cl.
*C08K 3/18* (2006.01)
*E04B 1/74* (2006.01)

(52) U.S. Cl. .......................................... 524/431; 252/62
(58) Field of Classification Search ................... 524/431
See application file for complete search history.

(56) References Cited

U.S. PATENT DOCUMENTS

| 7,708,974 B2 * | 5/2010 | Yadav ....................... 423/594.13 |
| 2006/0178254 A1 * | 8/2006 | Takeda et al. ..................... 501/1 |
| 2007/0187653 A1 | 8/2007 | Takeda et al. |
| 2008/0308775 A1 * | 12/2008 | Yabuki .......................... 252/587 |

FOREIGN PATENT DOCUMENTS

| CN | 1745149 A | 3/2006 |
| EP | 1676890 | 7/2006 |
| WO | 2007092030 | 8/2007 |
| WO | 2009024497 | 2/2009 |

OTHER PUBLICATIONS

Wiseman et al., Journal of Solid State Chemistry, vol. 6, 374-377, Mar. 1973.*
Chopra et al, Thin Solid Films vol. 102, 1 (1983).
Copending U.S. Appl. No. 12/671,547, filed Feb. 1, 2010.
Copending U.S. Appl. No. 12/740,114, filed Apr. 28, 2010.
English Language Abstract of CN 1745149 Mar. 8, 2006.

* cited by examiner

*Primary Examiner* — Ling Choi
*Assistant Examiner* — Hui Chin
(74) *Attorney, Agent, or Firm* — Tyler A. Stevenson

(57) ABSTRACT

Polymer dispersions of powders based on tungsten hydrogen bronze, especially containing a minor amount of tungsten metal, show good IR absorbing and heat shielding properties. The powders may be obtained by contacting an ammonium tungstate with hydrogen at a temperature of 2500 K or more, e.g. in a plasma.

14 Claims, 1 Drawing Sheet

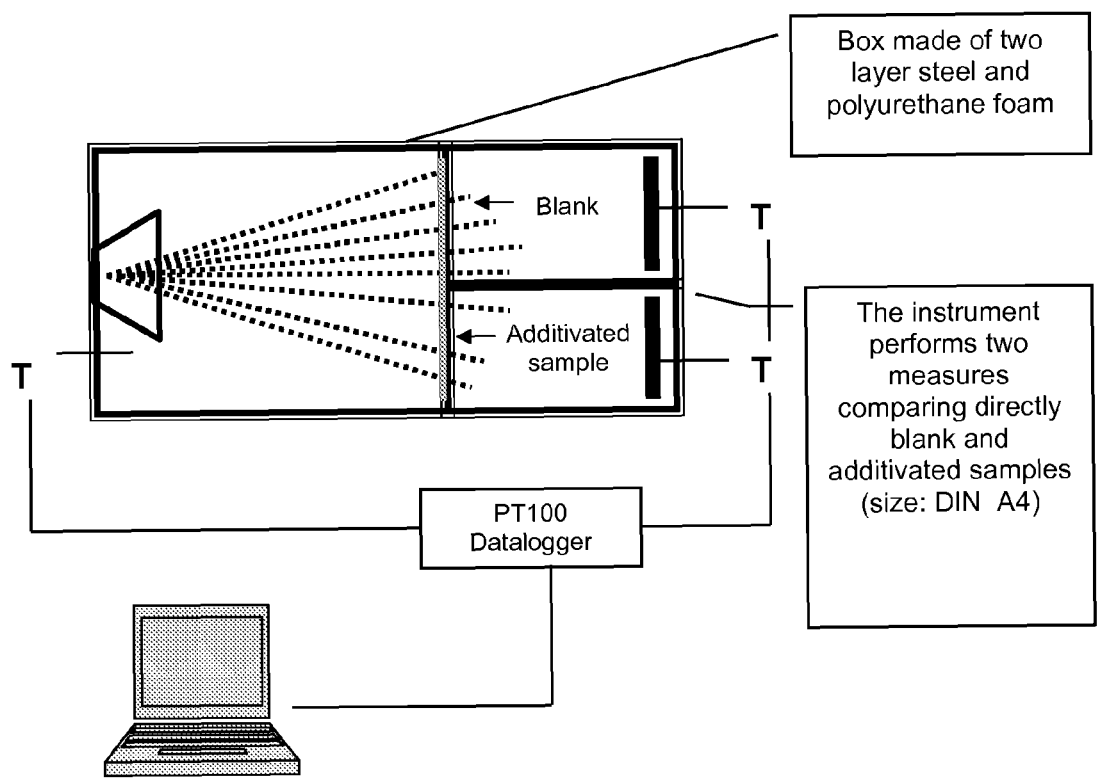

HEAT SHIELDING ADDITIVES

The present application pertains to certain particles of the tungsten/tungsten oxide series, a method for their preparation, compositions containing these particles, and the use of the particles as IR absorbers and/or heat shielding additives.

A number of metal oxides including certain tungstates have long been known to combine electric conductivity with heat shielding properties (Chopra et al., Thin Solid Films 102, 1 (1983)). Reactions of tungstates with various reductive agents including hydrogen and tungsten metal have been known to lead to coloured suboxides or composite oxides ("bronzes"). US-2007-187653 discloses the preparation of some tungsten oxides or bronzes by heating educts like tungsten hexachloride, ammonium metatungstate or tungstic acid combined with alkaline carbonates, or solutions of such educts up to 800° C.; materials thus obtained are recommended for the preparation of light transmitting electroconductive films with infrared-shielding properties.

Tungsten suboxide powders, (e.g. $WO_{2.7}$) are commercially available as fine powders (5-20 microns) e.g. from Osram Sylvania.

Tungsten suboxides and tungstates are known as infrared shielding material. The publications EP 1 676 890 and US2007/0187653 (Sumitomo Metal Mining Company) disclose an infrared shielding nanoparticle dispersion comprising tungsten trioxide having reduced oxygen. The preparation of some further tungstates is described in WO07/092030.

It has now been found that certain powders based on tungsten oxides and containing small amounts of tungsten metal, e.g. as obtainable in a high temperature process as explained further below, show especially valuable properties when dispersed in organic polymers. The present invention mainly provides a particle composition comprising a) 25-70 parts by weight, especially 30-55 parts by weight, of a hydrogen tungsten bronze, b) 20-70 parts by weight, especially 30-60 parts by weight, of a binary tungsten oxide, and c) 1-30 parts by weight, especially 2-20 parts by weight, of tungsten metal.

Usually, a major fraction, e.g. 50-100% b.w., preferably 80-100% b.w., of the hydrogen tungsten bronze is of cubic crystal structure. The most preferred tungsten bronze phase generally is the one described by Wiseman, J. Solid State Chem. 6, 374 (1973), of space group lm-3, except that no restriction to deuterium is necessary for use in the present invention, and the material thus may contain any hydrogen isotope, usually natural hydrogen.

The binary tungsten oxide in the present composition in its overall composition usually conforms to the formula $WO_{3-y}$, where y ranges from 0 to 1, for example from 0.01 to 0.55, preferably from 0 to 0.33, especially from 0 to 0.1. Examples of such binary tungsten oxides are widely known, examples are the phases $WO_3$, $WO_{2.92}$ (also known as $W_{25}O_{73}$), $WO_{2.83}$ (i.e. $W_{24}O_{68}$), $WO_{2.8}$ (i.e. $W_5O_{14}$), $WO_{2.72}$ (i.e. $W_{18}O_{49}$), $WO_{2.625}$ (i.e. $W_{32}O_{84}$), $WO_2$.

Most preferred binary tungsten oxide, often formed in the process as described further below, is the trioxide (corresponding to the above formula wherein y=0), in any of its modifications (especially the monoclinic and triclinic explained below), or combinations of said trioxide with minor amounts (e.g. up to 20% b.w.) of a suboxide (wherein y>0).

Some further preferred binary tungsten oxide phases include:

$WO_3$ in its monoclinic form, $P2_1/n$;
$WO_3$ in its triclinic form, P-1;
$WO_{2.92}$ in its monoclinic form, $P2_1/c$;
$WO_{2.8}$ in its tetragonal form, P 42 m;
$WO_{2.72}$ in its monoclinic form, P2/m;
$WO_{2.625}$ in its orthorhombic form, P b a m.

The particle composition of the invention may comprise components a-c each as separate particles or, preferably, the majority of particles, or all of them, are containing each of these components. Components a-c together usually make up 95-100% b.w. of the total powder composition; the remainders, if any, usually are organic polymers, other tungsten compounds and/or water. The (primary) particles are usually nanoparticles from the size range 1 nm to 800 nm, e.g. 90% b.w. of the particles are within that range, especially within the diameter range 5 to 300 nm; aggregates, if formed, e.g. in a dispersion, usually may be converted into primary particles, e.g. dispersions thereof, by well known techniques. Preferred powders are those wherein at least 80% b.w. of the particles have their smallest and their largest diameters from the range 5 to 300 nm. The particles embedded in their matrix are able to absorb relevant IR radiation (especially NIR, e.g. in the band from 800 to 2500 nm). The shape may be freely selected, e.g. from spheres, flakes and nanorods.

The invention further pertains to a process for the preparation of a hydrogen tungsten bronze, especially a hydrogen tungsten bronze composition comprising components a-c as defined above, which process comprises contacting an ammonium tungstate with hydrogen or a hydrogen releasing, reducing gas, at a temperature of 2500 K or more. Preferred ammonium tungstates for use in this process include ammonium monotungstate, ammonium paratungstates such as hexatungstate and dodekatungstate, and ammonium metatungstate, as well as their hydrates; an example is $(NH_4)_{10}W_{12}H_2O_{42}\cdot4H_2O$. Suitable gases for reduction and hydrogen release include, for example, ammonia or volatile hydrocarbons like ethane or propane; these may be used in place of hydrogen or as a mixture with hydrogen. The contacting is preferably effected in a plasma, especially where hydrogen and/or the hydrogen releasing gas is used in mixture with a noble gas.

The plasma torch is preferably an induction plasma torch. The preferred induction plasma torches for use in the process of the present invention are available from Tekna Plasma Systems, Inc. of Sherbrooke, Quebec, Canada. Boulos et al., U.S. Pat. No. 5,200,595, is hereby incorporated by reference for its teachings relative to the construction and operation of plasma induction torches.

The present particle composition brings about the advantage of good dispersibility in the polymer, good heat shielding properties of the polymer composition thus obtainable, and good transparency, low haze. The resulting polymer compositions generally show low discoloration and good colour stability upon aging (low yellowing).

The particles may be incorporated e.g. by an additive blending technique using a mixer, kneader or extruder, into coating or plastic compositions, e.g. thermoplastic polymer materials in form of films or sheets. The particles may be used to obtain transparent or translucent, especially transparent, materials having highly effective IR absorption/heat shielding properties, and/or to improve the heat absorption efficacy of the material. The present powder compositions advantageously are used as an additive in the following polymer matrices:

1. Polymers of monoolefins and diolefins, for example polypropylene, polyisobutylene, polybut-1-ene, poly-4-methylpent-1-ene, polyvinylcyclohexane, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, preferably polyethylene and polypropylene, can be prepared by different, and especially by the following, methods:

a) radical polymerisation (normally under high pressure and at elevated temperature).

b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either $\pi$- or $\sigma$-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, ethylene/vinylcyclohexane copolymers, ethylene/cycloolefin copolymers (e.g. ethylene/norbornene like COC), ethylene/1-olefins copolymers, where the 1-olefin is gene-rated in-situ; propylene/butadiene copolymers, isobutylene/isoprene copolymers, ethylene/vinylcyclohexene copolymers, ethylene/alkyl acrylate copolymers, ethylene/alkyl methacrylate copolymers, ethylene/vinyl acetate copolymers or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

4. Hydrocarbon resins (for example $C_5$-$C_9$) including hydrogenated modifications thereof (e.g. tackifiers) and mixtures of polyalkylenes and starch.

Homopolymers and copolymers from 1.)-4.) may have any stereostructure including syndiotactic, isotactic, hemi-isotactic or atactic; where atactic polymers are preferred. Stereoblock polymers are also included.

5. Polystyrene, poly(p-methylstyrene), poly($\alpha$-methylstyrene).

6. Aromatic homopolymers and copolymers derived from vinyl aromatic monomers including styrene, $\alpha$-methylstyrene, all isomers of vinyl toluene, especially p-vinyltoluene, all isomers of ethyl styrene, propyl styrene, vinyl biphenyl, vinyl naphthalene, and vinyl anthracene, and mixtures thereof. Homopolymers and copolymers may have any stereostructure including syndiotactic, isotactic, hemi-isotactic or atactic; where atactic polymers are preferred. Stereoblock polymers are also included.

6a. Copolymers including aforementioned vinyl aromatic monomers and comonomers selected from ethylene, propylene, dienes, nitriles, acids, maleic anhydrides, maleimides, vinyl acetate and vinyl chloride or acrylic derivatives and mixtures thereof, for example styrene/butadiene, styrene/acrylonitrile, styrene/ethylene (interpolymers), styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

6b. Hydrogenated aromatic polymers derived from hydrogenation of polymers mentioned under 6.), especially including polycyclohexylethylene (PCHE) prepared by hydrogenating atactic polystyrene, often referred to as polyvinylcyclohexane (PVCH).

6c. Hydrogenated aromatic polymers derived from hydrogenation of polymers mentioned under 6a.).

Homopolymers and copolymers may have any stereostructure including syndiotactic, isotactic, hemi-isotactic or atactic; where atactic polymers are preferred. Stereoblock polymers are also included.

7. Graft copolymers of vinyl aromatic monomers such as styrene or $\alpha$-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated and brominated copolymer of isobutylene-isoprene (halobutyl rubber), chlorinated or sulfochlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

9. Polymers derived from α,β-unsaturated acids and derivatives thereof such as polyacrylates and polymethacrylates; polymethyl methacrylates, polyacrylamides and polyacrylonitriles, impact-modified with butyl acrylate.

10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.

12. Homopolymers and copolymers of cyclic ethers such as polyalkylene glycols, polyethylene oxide, polypropylene oxide or copolymers thereof with bisglycidyl ethers.

13. Polyacetals such as polyoxymethylene and those polyoxymethylenes which contain ethylene oxide as a comonomer; polyacetals modified with thermoplastic polyurethanes, acrylates or MBS.

14. Polyphenylene oxides and sulfides, and mixtures of polyphenylene oxides with styrene polymers or polyamides.

15. Polyurethanes derived from hydroxyl-terminated polyethers, polyesters or polybutadienes on the one hand and aliphatic or aromatic polyisocyanates on the other, as well as precursors thereof.

16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).

17. Polyureas, polyimides, polyamide-imides, polyetherimides, polyesterimides, polyhydantoins and polybenzimidazoles.

18. Polyesters derived from dicarboxylic acids and diols and/or from hydroxycarboxylic acids or the corresponding lactones or lactides, for example polyethylene terephthalate, polybutylene terephthalate, poly-1,4-dimethylolcyclohexane terephthalate, polyalkylene naphthalate and polyhydroxybenzoates as well as copolyether esters derived from hydroxyl-terminated polyethers, and also polyesters modified with polycarbonates or MBS. Copolyesters may comprise, for example—but are not limited to—polybutylenesuccinate/terephtalate, polybutyleneadipate/terephthalate, polytetramethyleneadipate/terephthalate, polybutylensuccinate/adipate, polybutylensuccinate/carbonate, poly-3-hydroxybutyrate/octanoate copolymer, poly-3-hydroxybutyrate/hexanoate/decanoate terpolymer. Furthermore, aliphatic polyesters may comprise, for example—but are not limited to—the class of poly(hydroxyalkanoates), in particular, poly(propiolactone), poly(butyrolactone), poly(pivalolactone), poly(valerolactone) and poly(caprolactone), polyethylenesuccinate, polypropylenesuccinate, polybutylenesuccinate, polyhexamethylenesuccinate, polyethyleneadipate, polypropyleneadipate, polybutyleneadipate, polyhexamethyleneadipate, polyethyleneoxalate, polypropyleneoxalate, polybutyleneoxalate, polyhexamethyleneoxalate, polyethylenesebacate, polypropylenesebacate, polybutylenesebacate and polylactic acid (PLA) as well as corresponding polyesters modified with polycarbonates or MBS. The term "polylactic acid (PLA)" designates a homopolymer of preferably poly-L-lactide and any of its blends or alloys with other polymers; a co-polymer of lactic acid or lactide with other monomers, such as hydroxy-carboxylic acids, like for example glycolic acid, 3-hydroxy-butyric acid, 4-hydroxy-butyric acid, 4-hydroxy-valeric acid, 5-hydroxy-valeric acid, 6-hydroxy-caproic acid and cyclic forms thereof; the terms "lactic acid" or "lactide" include L-lactic acid, D-lactic acid, mixtures and dimers thereof, i.e. L-lactide, D-lactide, meso-lactide and any mixtures thereof.

19. Polycarbonates and polyester carbonates.

20. Polyketones.

21. Polysulfones, polyether sulfones and polyether ketones.

22. Crosslinked polymers derived from aldehydes on the one hand and phenols, ureas and melamines on the other hand, such as phenol/formaldehyde resins, urea/formaldehyde resins and melamine/formaldehyde resins.

23. Drying and non-drying alkyd resins.

24. Unsaturated polyester resins derived from copolyesters of saturated and unsaturated dicarboxylic acids with polyhydric alcohols and vinyl compounds as crosslinking agents, and also halogen-containing modifications thereof of low flammability.

25. Crosslinkable acrylic resins derived from substituted acrylates, for example epoxy acrylates, urethane acrylates or polyester acrylates.

26. Alkyd resins, polyester resins and acrylate resins crosslinked with melamine resins, urea resins, isocyanates, isocyanurates, polyisocyanates or epoxy resins.

27. Crosslinked epoxy resins derived from aliphatic, cycloaliphatic, heterocyclic or aromatic glycidyl compounds, e.g. products of diglycidyl ethers of bisphenol A and bisphenol F, which are crosslinked with customary hardeners such as anhydrides or amines, with or without accelerators.

28. Natural polymers such as cellulose, rubber, gelatin and chemically modified homologous derivatives thereof, for example cellulose acetates, cellulose propionates and cellulose butyrates, or the cellulose ethers such as methyl cellulose; as well as rosins and their derivatives.

29. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

In case of transparent and translucent polymer materials, the amount of light transmitted through the present materials, i.e. degree of translucency or transparency, mainly depends on well known parameters such as the particle loading, further additives used, haze level of the polymer matrix, and thickness of the material. The present materials usually are at least 80%, or rather more than 90% translucent in each part of the visible range (400-800 nm); preferred materials have good transparency, and especially are selected from clear-transparent sheets and films of thickness less than 10 mm (e.g. 0.01 to 5 mm). Preferred materials further share one or more of the following advantageous properties:

a full solar radiation transmittance (340-1800 nm) of less than 60%,
a haze of less than 10%,
an electromagnetic shielding in the range 10-2000 MHz of less than 2 dB, and
a full visible light transmittance (400-800 nm) of more than 75%.

The present particles advantageously are used as an additive in the following plastic matrices (especially in the case of transparent and translucent polymer products):

Polycarbonate (PC) or a coating or coextruded layer on polycarbonate, polyesters, acrylics, halogenated polymers such as polyvinylchloride (PVC), polyolefins, aromatic homopolymers and copolymers derived from vinyl aromatic monomers and graft copolymers thereof such as acrylnitril-butadiene-styrene terpolymer (ABS), containing these polymers as major component or in essentially pure form (e.g. 50-100% b.w.), especially:

a polymer selected from PC, polymethylmethacrylate (PMMA), polyethyleneterephthalate (PET, PET-G), PVC, transparent ABS, polyvinylidene fluoride (PVDF), styrene-acrylnitril copolymer (SAN), polypropylene (PP), polyethylene (PE) including blends, alloys, co-polymers.

Incorporation into the polymer matrix leads to plastic articles which may be highly transparent; they may be colorless (e.g. for clear glazings or films) or colored, e.g. by addition of a pigment or mixture of pigments, e.g. for applications wherein suitable light filtering or sun screening is desired, or in the case of coloured coatings. The present oxide or nitride materials allow high loading, giving access to high heat shielding effects. Preferable loadings are from 0.01 to 15%, especially 0.1 to 5% by weight of the final polymer composition.

The present particles may further be functionalized at their surface before incorporation using known methods, e.g. silanization, use of thiols, amines, phosphines, stearates, etc.

In preferred embodiments, the present particle and/or powder compositions are combined with one or more further additives, e.g. selected from the following materials:

1. Antioxidants
   1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures thereof.
   1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.
   1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl)adipate.
   1.4. Tocopherols, for example α-tocopherol, β-tocopherol, γ-tocopherol, δ-tocopherol and mixtures thereof (vitamin E).
   1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl)-disulfide.
   1.6. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl)butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis(3,5-di-tert-butyl-4-hydroxyphenyl)propane, 2,2-bis(5-tert-butyl-4-hydroxy2-methylphenyl)-4-n-dodecylmercaptobutane, 1,1,5,5-tetra-(5-tert-butyl-4-hydroxy-2-methylphenyl)pentane.
   1.7. O-, N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.
   1.8. Hydroxybenzylated malonates, for example dioctadecyl-2,2-bis(3,5-di-tert-butyl-2-hydroxybenzyl)malonate, di-octadecyl-2-(3-tert-butyl-4-hydroxy-5-methylbenzyl)malonate, didodecylmercaptoethyl-2,2-bis(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate.
   1.9. Aromatic hydroxybenzyl compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.
   1.10. Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris-(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris-(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.
   1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tertbutyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis-(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane; 3,9-bis[2-{3-(3-tert-butyl-4-hydroxy-5-methylphenyl)propionyloxy}-1,1-dimethylethyl]-2,4,8,10-tetraoxaspiro[5.5]-undecane.

1.15. Esters of β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl) propionic acid e.g. N,N'-bis(3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard® XL-1, supplied by Uniroyal).

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyl-diphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octylphenothiazines, N-allylphenothiazine, N,N,N',N'-tetraphenyl-1,4-diaminobut-2-ene.

2. UV Absorbers and Light Stabilizers 2.1. 2-(2'-Hydroxyphenyl)benzotriazoles, for example 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis-(α,α-dimethylbenzyl)-2'-hydroxyphenyl)benzotriazole, 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl)phenyl)-5-chloro-benzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl)phenylbenzotriazole, 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO—CH$_2$CH$_2$—]$_2$, where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)-phenyl]-benzotriazole; 2-[2'-hydroxy-3'-(1,1,3,3-tetramethylbutyl)-5'-(α,α-dimethylbenzyl)-phenyl]benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, for example 4-tert-butyl-phenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxycinnamate, butyl α-cyano-β-methyl-p-methoxycinnamate, methyl α-carbomethoxy-p-methoxycinnamate, N-(β-carbomethoxy-β-cyanovinyl)-2-methylindoline, neopentyl tetra(α-cyano-β,β-diphenylacrylate.

2.5. Nickel compounds, for example nickel complexes of 2,2'-thio-bis[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenylundecylketoxime, nickel complexes of 1-phenyl-4-lauroyl-5-hydroxypyrazole, with or without additional ligands.

2.6. Sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl)n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butanetetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethylpiperidyl)sebacate, bis(1-octyloxy-2,2,6,6-tetramethylpiperidyl)succinate, linear or cyclic condensates of N,N'-bis(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensate of N,N'-bis(2,2,6,6-tetramethyl-4-piperidyl)hexamethylenediamine and 4-cyclohexylamino-2,6-dichloro-1,3,5-triazine, a condensate of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); a condensate of 1,6-hexanediamine and 2,4,6-trichloro-1,3,5-triazine as well as N,N-dibutylamine and 4-butylamino-2,2,6,6-tetramethylpiperidine (CAS Reg. No. [192268-64-7]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxospiro[4,5]decane, a reaction product of 7,7,9,9-tetramethyl-2-cycloundecyl-1-oxa-3,8-diaza-4-oxospiro-[4,5]decane and epichlorohydrin, 1,1-bis(1,2,2,6,6-pentamethyl-4-piperidyloxycarbonyl)-2-(4-methoxyphenyl)ethene, N,N'-bisformyl-N,N'-bis(2,2,6,6-tetramethyl-4-piperidyl)hexamethylenediamine, a diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, a reaction product of maleic acid anhydride-α-olefin copolymer with 2,2,6,6-tetramethyl-4-aminopiperidine or 1,2,2,6,6-pentamethyl-4-aminopiperidine, 2,4-bis[N-(1-cyclohexyloxy-2,2,6,6-tetramethylpiperidine-4-yl)-N-butylamino]-6-(2-hydroxyethyl)amino-1,3,5-triazine, 1-(2-hydroxy-2-methylpropoxy)-4-octadecanoyloxy-2,2,6,6-tetramethylpiperidine, 5-(2-ethylhexanoyl)-oxymethyl-3,3,5-trimethyl-2-morpholinone, Sanduvor (Clariant; CAS Reg. No. 106917-31-1], 5-(2-ethylhexanoyl)oxymethyl-3,3,5-trimethyl-2-morpholinone, the reaction product of 2,4-bis-[(1-cyclohexyloxy-2,2,6,6-piperidine-4-yl)butylamino]-6-chloro-s-triazine with N,N'-bis(3-aminopropyl) ethylenediamine), 1,3,5-tris(N-cyclohexyl-N-(2,2,6,6-tetramethylpiperazine-3-one-4-yl)amino)-s-triazine, 1,3,5-tris(N-cyclohexyl-N-(1,2,2,6,6-pentamethylpiperazine-3-one-4-yl)-amino)-s-triazine.

2.7. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine, 2,4-bis(4-[2-ethylhexyloxy]-2-hydroxyphenyl)-6-(4-methoxyphenyl)-1,3,5-triazine.

3. Metal deactivators, for example N,N'-diphenyloxamide, N-salicylal-N'-salicyloyl hydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.

4. Phosphites and phosphonites, for example triphenyl phosphite, diphenylalkyl phosphites, phenyldialkyl phosphites, tris(nonylphenyl)phosphite, trilauryl phosphite, trioctadecyl phosphite, distearylpentaerythritol diphosphite, tris(2,4-di-tert-butylphenyl)phosphite, diisodecyl pentaerythritol diphosphite, bis(2,4-di-tert-butylphenyl)pentaerythritol diphosphite, bis(2,4-dicumylphenyl)pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)-pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, bis(2,4-di-tert-butyl-6-methylphenyl) methyl phosphite, bis(2,4-di-tert-butyl-6-methylphenyl) ethyl phosphite, 6-fluoro-2,4,8,10-tetra-tert-butyl-12-methyl-dibenz[d,g]-1,3,2-dioxaphosphocin, 2,2',2''-nitrilo-[triethyltris(3,3',5,5'-tetra-tert-butyl-1,1'-biphenyl-2,2'-diyl) phosphite], 2-ethylhexyl(3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane.

The following phosphites are especially preferred:

Tris(2,4-di-tert-butylphenyl)phosphite (Irgafos® 168, Ciba Specialty Chemicals Inc.), tris(nonylphenyl)phosphite, (A)

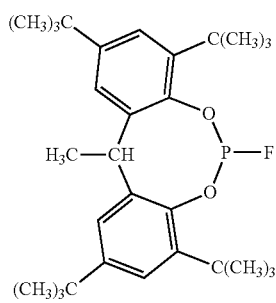

(B)

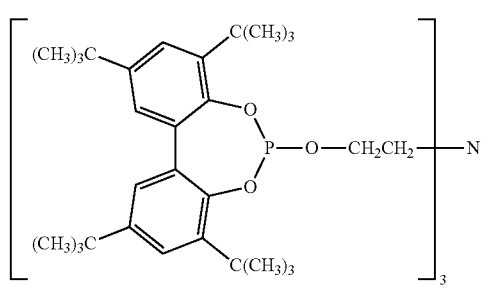

(C)

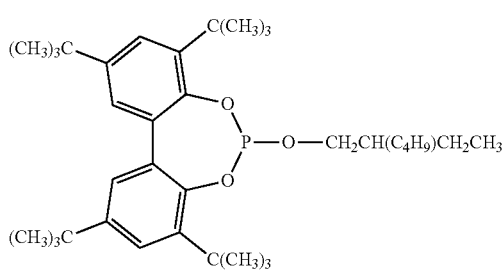

(D)

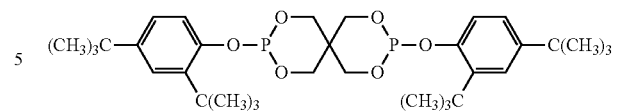

(E)

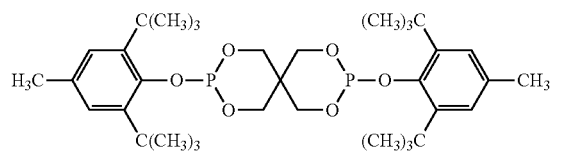

(F)

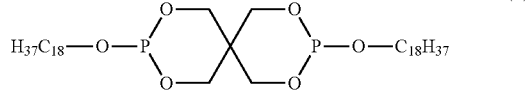

(G)

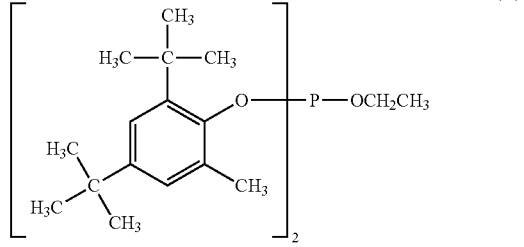

5. Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

6. Nitrones, for example, N-benzyl-alpha-phenylnitrone, N-ethyl-alpha-methylnitrone, N-octyl-alpha-heptylnitrone, N-lauryl-alpha-undecylnitrone, N-tetradecyl-alpha-tridecylnnitrone, N-hexadecyl-alpha-pentadecylnitrone, N-octadecyl-alpha-heptadecylnitrone, N-hexadecyl-alpha-heptadecylnitrone, N-ocatadecyl-alpha-pentadecylnitrone, N-heptadecyl-alpha-heptadecylnitrone, N-octadecyl-alpha-hexadecylnitrone, nitrone derived from N,N-dialkylhydroxylamine derived from hydrogenated tallow amine.

7. Thiosynergists, for example dilauryl thiodipropionate, dimistryl thiodipropionate, distearyl thiodipropionate or distearyl disulfide.

8. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

9. Polyamide stabilizers, for example copper salts in combination with iodides and/or phosphorus compounds and salts of divalent manganese.

10. Basic co-stabilizers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example calcium stearate, zinc stearate, magnesium behenate, magnesium stearate, sodium ricinoleate and potassium palmitate, antimony pyrocatecholate or zinc pyrocatecholate.

11. Nucleating agents, for example inorganic substances, such as talcum, metal oxides, such as titanium dioxide or magnesium oxide, phosphates, carbonates or sulfates of, preferably, alkaline earth metals; organic compounds, such as mono- or polycarboxylic acids and the salts thereof, e.g. 4-tert-butylbenzoic acid, adipic acid, diphenylacetic acid, sodium succinate or sodium benzoate; polymeric compounds, such as ionic copolymers (ionomers). Especially preferred are 1,3:2,4-bis(3',4'-dimethylbenzylidene)sorbitol, 1,3:2,4-di(paramethyldibenzylidene)sorbitol, and 1,3:2,4-di(benzylidene)sorbitol.

12. Fillers and reinforcing agents, for example calcium carbonate, silicates, glass fibres, glass beads, asbestos, talc, kaolin, mica, barium sulfate, metal oxides and hydroxides, carbon black, graphite, wood flour and flours or fibers of other natural products, synthetic fibers.

13. Other additives, for example plasticisers, lubricants, emulsifiers, pigments, rheology additives, catalysts, flow-control agents, optical brighteners, flameproofing agents, antistatic agents and blowing agents.

14. Benzofuranones and indolinones, for example those disclosed in U.S. Pat. No. 4,325,863; U.S. Pat. No. 4,338,244; U.S. Pat. No. 5,175,312; U.S. Pat. No. 5,216,052; U.S. Pat. No. 5,252,643; DE-A-4316611; DE-A-4316622; DE-A-4316876; EP-A-0589839, EP-A-0591102; EP-A-1291384 or 3-[4-(2-acetoxyethoxy)phenyl]-5,7-di-tert-butylbenzofuran-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butylbenzofuran-2-one, 3-(3,5-dimethyl-4-pivaloyloxyphenyl)-5,7-di-tert-butylbenzofuran-2-one, 3-(3,4-dimethylphenyl)-5,7-di-tert-butylbenzofuran-2-one, 3-(2,3-dimethylphenyl)-5,7-di-tert-butylbenzofuran-2-one, 3-(2-acetyl-5-isooctylphenyl)-5-isooctylbenzofuran-2-one.

One or more of these further additives are usually contained in an amount of 0.01 to about 10% of the composition, often in a concentration level of about 0.1 to 5% by weight of the final composition. Important are, for example, antioxidants (e.g. phenolic antioxidants and/or phosph(on)ites listed above) and, for many applications, flame retardants. Clarifiers/nucleating agents may be added to provide or improve transparency, especially in polyolefin compositions. Especially preferred is the combination of the present nanoparticles with light stabilizers such as UV absorbers and/or sterically hindered amines (HALS). Zinc oxide in particular is a well known plastic additive that absorbs strongly UV radiation, improving plastic durability. Further, strong synergistic effects are known when combined with light stabilizers such as HALS (see e.g. EP-A-690094; U.S. Pat. No. 5,948,836).

Plastic materials, especially films of the present invention, containing polymers and nanoparticles as described above, advantageously may be used in technical application fields such as architectural glazing, glazing in building and construction, automotive glazing, transportation glazing, agricultural films and structures. The materials may be solid sheets, monolithic sheets, twin-wall sheets, multi-wall sheets, flat sheets, corrugated sheets, films, oriented or mono- or biaxially oriented films, lamination films, capstock films. Specific application fields include wintergarden and veranda buildings, facades, skylights, pool covers and enclosures, roof structures, vaults, walkways, shelters, signage, interior and exterior design elements, sun shades, side window, rear window, panorama roof, greenhouses.

Main applications are heat-shielding, light management, heat management, energy management, solar control; also of importance are laser welding, security features, marking, tracers, heat transfer.

Compositions of the invention preferably are unplasticized. Compositions of the invention do not require any further metals or metallic particles and usually do not contain such components. Of special technical interest are rigid, transparent compositions, such as plates or sheets, for automotive or architectural glazings, or translucent or transparent polyolefin or polyolefin copolymer films, especially for agricultural applications.

The additives of the invention and optional further components may be added to the polymer material individually or mixed with one another. If desired, the individual components can be mixed with one another before incorporation into the polymer for example by dry blending, compaction or in the melt.

The incorporation of the additives of the invention and optional further components into the polymer is carried out by known methods such as dry blending in the form of a powder, or wet mixing in the form of solutions, dispersions or suspensions for example in an inert solvent, water or oil. The additives of the invention and optional further additives may be incorporated, for example, before or after molding or also by applying the dissolved or dispersed additive or additive mixture to the polymer material, with or without subsequent evaporation of the solvent or the suspension/dispersion agent. They may be added directly into the processing apparatus (e.g. extruders, internal mixers, etc), e.g. as a dry mixture or powder or as solution or dispersion or suspension or melt.

The incorporation can be carried out in any heatable container equipped with a stirrer, e.g. in a closed apparatus such as a kneader, mixer or stirred vessel. The incorporation is preferably carried out in an extruder or in a kneader. It is immaterial whether processing takes place in an inert atmosphere or in the presence of oxygen.

The addition of the additive or additive blend to the polymer can be carried out in all customary mixing machines in which the polymer is melted and mixed with the additives. Suitable machines are known to those skilled in the art. They are predominantly mixers, kneaders and extruders.

The process is preferably carried out in an extruder by introducing the additive during processing.

Particularly preferred processing machines are single-screw extruders, contrarotating and corotating twin-screw extruders, planetary-gear extruders, ring extruders or cokneaders. It is also possible to use processing machines provided with at least one gas removal compartment to which a vacuum can be applied.

Suitable extruders and kneaders are described, for example, in *Handbuch der Kunststoffextrusion,* Vol. 1 Grundlagen, Editors F. Hensen, W. Knappe, H. Potente, 1989, pp. 3-7, ISBN: 3-446-14339-4 (Vol. 2 Extrusionsanlagen 1986, ISBN 3-446-14329-7).

For example, the screw length is 1-60 screw diameters, preferably 20-48 screw diameters. The rotational speed of the screw is preferably 1-800 rotations per minute (rpm), very particularly preferably 25-400 rpm.

The maximum throughput is dependent on the screw diameter, the rotational speed and the driving force. The process of the present invention can also be carried out at a level lower than maximum throughput by varying the parameters mentioned or employing weighing machines delivering dosage amounts.

If a plurality of components is added, these can be premixed or added individually.

The additives of the invention and optional further additives can also be added to the polymer in the form of a masterbatch ("concentrate") which contains the components in a concentration of, for example, about 5% to about 80% and preferably 5% to about 40% by weight incorporated in a polymer and/or dispersed in a suitable solvent. The polymer must not be necessarily of identical structure than the polymer where the additives are added finally. In such operations, the polymer can be used in the form of powder, granules, solutions, suspensions or in the form of latices.

Incorporation can take place prior to or during the shaping operation, or by applying the dissolved or dispersed compound to the polymer, with or without subsequent evaporation of the solvent. In the case of elastomers, these can also be stabilized as latices. A further possibility for incorporating the additives of the invention into polymers is to add them before, during or directly after the polymerization of the corresponding monomers or prior to crosslinking. In this context the additive of the invention can be added as it is or else in encapsulated form (for example in waxes, oils or polymers).

The materials containing the additives of the invention described herein can be used for the production of moldings, rotomolded articles, injection molded articles, blow molded articles, films, tapes, mono-filaments, fibers, nonwovens, profiles, adhesives or putties, surface coatings and the like.

The present matrix material may also be a coating material or a cured coating comprising as component (a) a suitable binder. The binder (component (A)) can in principle be any binder which is customary in industry, for example those described in Ullmann's Encyclopedia of Industrial Chemistry, 5th Edition, Vol. A18, pp. 368-426, VCH, Weinheim 1991. In general, it is a film-forming binder based on a thermoplastic or thermosetting resin, predominantly on a thermosetting resin. Examples thereof are alkyd, acrylic, polyester, phenolic, melamine, epoxy and polyurethane resins and mixtures thereof.

Component (A) can be a cold-curable or hot-curable binder; the addition of a curing catalyst may be advantageous. Suitable catalysts which accelerate curing of the binder are described, for example, in Ullmann's Encyclopedia of Industrial Chemistry, Vol. A18, p. 469, VCH Verlagsgesellschaft, Weinheim 1991.

Preference is given to coating compositions in which component (A) is a binder comprising a functional acrylate resin and a crosslinking agent.

Examples of coating compositions containing specific binders are:

1. paints based on cold- or hot-crosslinkable alkyd, acrylate, polyester, epoxy or melamine resins or mixtures of such resins, if desired with addition of a curing catalyst;
2. two-component polyurethane paints based on hydroxyl-containing acrylate, polyester or polyether resins and aliphatic or aromatic isocyanates, isocyanurates or polyisocyanates;
3. two-component polyurethane paints based on thiol-containing acrylate, polyester or polyether resins and aliphatic or aromatic isocyanates, isocyanurates or polyisocyanates;
4. one-component polyurethane paints based on blocked isocyanates, isocyanurates or polyisocyanates which are deblocked during baking, if desired with addition of a melamine resin;
5. one-component polyurethane paints based on aliphatic or aromatic urethanes or polyurethanes and hydroxyl-containing acrylate, polyester or polyether resins;
6. one-component polyurethane paints based on aliphatic or aromatic urethaneacrylates or polyurethaneacrylates having free amino groups within the urethane structure and melamine resins or polyether resins, if necessary with curing catalyst;
7. two-component paints based on (poly)ketimines and aliphatic or aromatic isocyanates, isocyanurates or polyisocyanates;
8. two-component paints based on (poly)ketimines and an unsaturated acrylate resin or a polyacetoacetate resin or a methacrylamidoglycolate methyl ester;
9. two-component paints based on carboxyl- or amino-containing polyacrylates and polyepoxides;
10. two-component paints based on acrylate resins containing anhydride groups and on a polyhydroxy or polyamino component;
11. two-component paints based on acrylate-containing anhydrides and polyepoxides;
12. two-component paints based on (poly)oxazolines and acrylate resins containing anhydride groups, or unsaturated acrylate resins, or aliphatic or aromatic isocyanates, isocyanurates or polyisocyanates;
13. two-component paints based on unsaturated polyacrylates and polymalonates;
14. thermoplastic polyacrylate paints based on thermoplastic acrylate resins or externally crosslinking acrylate resins in combination with etherified melamine resins;
15. paint systems based on siloxane-modified or fluorine-modified acrylate resins;
16. paint systems, especially for clearcoats, based on malonate-blocked isocyanates with melamine resins (e.g. hexamethoxymethylmelamine) as crosslinker (acid catalyzed);
17. UV-curable systems based on oligomeric urethane acrylates and/or acrylatacrylaten, if desired in combination with other oligomers or monomers;
18. dual cure systems, which are cured first by heat and subsequently by UV or electron irradiation, or vice versa, and whose components contain ethylenic double bonds capable to react on irradiation with UV light in presence of a photoinitiator or with an electron beam.

Coating systems based on siloxanes are also possible, e.g. systems described in WO 98/56852, WO 98/56853, DE-A-2914427, or DE-A-4338361.

In addition to components (A) and (B), the coating composition according to the invention preferably comprises as component (C) a light stabilizer of the sterically hindered amine type, the 2-(2-hydroxyphenyl)-1,3,5-triazine and/or 2-hydroxyphenyl-2H-benzotriazole type, for example as mentioned in the above list in sections 2.1, 2.6 and 2.8. Further examples for light stabilizers of the 2-(2-hydroxyphenyl)-1,3,5-triazine type advantageously to be added can be found e.g. in the publications U.S. Pat. No. 4,619,956, EP-A-434608, U.S. Pat. No. 5,198,498, U.S. Pat. No. 5,322,868, U.S. Pat. No. 5,369,140, U.S. Pat. No. 5,298,067, WO-94/18278, EP-A-704437, GB-A-2297091, WO-96/28431. Of special technical interest is the addition of compounds of the classes 2-resorcinyl-4,6-diphenyl-1,3,5-triazine, 2-resorcinyl-4,6-bis(biphenylyl)-1,3,5-triazine, and/or 2-hydroxyphenyl-2H-benztriazole.

Apart from components (A), (B) and, if used, (C), the coating composition can also comprise further components, examples being solvents, pigments, dyes, plasticizers, stabilizers, rheologic or thixotropic agents, drying catalysts and/or leveling agents. Examples of possible components are described in Ullmann's Encyclopedia of Industrial Chemistry, 5th Edition, Vol. A18, pp. 429-471, VCH, Weinheim 1991.

Possible drying catalysts or curing catalysts are, for example, free (organic) acids or bases, or (organic) blocked acids or bases which may be deblocked by thermal treatment or irradiation, organometallic compounds, amines, amino-containing resins and/or phosphines. Examples of organometallic compounds are metal carboxylates, especially those of the metals Pb, Mn, Co, Zn, Zr or Cu, or metal chelates, especially those of the metals Al, Ti, Zr or Hf, or organometallic compounds such as organotin compounds.

Examples of metal carboxylates are the stearates of Pb, Mn or Zn, the octoates of Co, Zn or Cu, the naphthenates of Mn and Co or the corresponding linoleates, resinates or tallates.

Examples of metal chelates are the aluminium, titanium or zirconium chelates of acetylacetone, ethyl acetylacetate, salicylaldehyde, salicylaldoxime, o-hydroxyacetophenone or ethyl trifluoroacetylacetate, and the alkoxides of these metals.

Examples of organotin compounds are dibutyltin oxide, dibutyltin dilaurate or dibutyltin dioctoate.

Examples of amines are, in particular, tertiary amines, for example tributylamine, triethanolamine, N-methyldiethanolamine, N-dimethylethanolamine, N-ethylmorpholine, N-methylmorpholine or diazabicyclooctane (triethylenediamine), diazabicycloundecene, DBN (=1,5-diazabicyclo[4.3.0]non-5-ene), and salts thereof. Further examples are quaternary ammonium salts, for example trimethylbenzylammonium chloride.

Amino-containing resins are simultaneously binder and curing catalyst. Examples thereof are amino-containing acrylate copolymers.

The curing catalyst used can also be a phosphine, for example triphenylphosphine.

The novel coating compositions can also be radiation-curable coating compositions. In this case, the binder essentially comprises monomeric or oligomeric compounds containing ethylenically unsaturated bonds (prepolymers), which after application are cured by actinic radiation, i.e. converted into a crosslinked, high molecular weight form. Where the system is UV-curing, it generally contains at least one photoinitiator as well. Corresponding systems are described in the above-mentioned publication Ullmann's Encyclopedia of Industrial Chemistry, 5th Edition, Vol. A18, pages 451-453. In radiation-curable coating compositions, the novel stabilizers can also be employed without the addition of sterically hindered amines.

The coating compositions according to the invention can be applied to any desired substrates, for example to metal, wood, plastic or ceramic materials. They are preferably used as topcoat in the finishing of automobiles. If the topcoat comprises two layers, of which the lower layer is pigmented and the upper layer is not pigmented, the novel coating composition can be used for either the upper or the lower layer or for both layers, but preferably for the upper layer.

The novel coating compositions can be applied to the substrates by the customary methods, for example by brushing, spraying, pouring, dipping or electrophoresis; see also Ullmann's Encyclopedia of Industrial Chemistry, 5th Edition, Vol. A18, pp. 491-500.

Depending on the binder system, the coatings can be cured at room temperature or by heating. The coatings are preferably cured at 50-150° C., and in the case of powder coatings or coil coatings even at higher temperatures.

The coatings obtained in accordance with the invention have excellent resistance to the damaging effects of light, oxygen and heat; particular mention should be made of the good light stability and weathering resistance of the coatings thus obtained, for example paints.

The coating compositions can comprise an organic solvent or solvent mixture in which the binder is soluble. The coating composition can otherwise be an aqueous solution or dispersion. The vehicle can also be a mixture of organic solvent and water. The coating composition may be a high-solids paint or can be solvent-free (e.g. a powder coating material). Powder coatings are, for example, those described in Ullmann's Encyclopedia of Industrial Chemistry, 5th Ed., A18, pages 438-444. The powder coating material may also have the form of a powder-slurry (dispersion of the powder preferably in water).

The pigments can be inorganic, organic or metallic pigments. The novel coating compositions preferably contain no pigments and are used as a clearcoat.

The present matrix material may also be an inorganic polymer composition or organic/inorganic polymer hybrid system, e.g. a sol-gel coating. Examples are metal oxide systems based on metal alkoxides such as Si, Ti, Xr, Al alkoxides, or hybrid coatings based on a mixture of resin+metal alkoxide; examples for such systems and their preparation are given in section [0169] of US20070187653, or EP-A-1676890 col. 18, lines 9-16, which passages are hereby incorporated by reference.

In a further embodiment the invention relates to the use of a blend comprising hydrogen tungsten bronze as defined above and in addition a dithiolen metal complex of the formula I or II as disclosed in the European Patent application EP 07 100657.1 to increase the heat-input amount of near infrared radiation.

In a further embodiment the invention relates to the use of a blend comprising hydrogen tungsten bronze as defined above and in addition at least one organic IR absorber selected from quinone-diimmonium salt, aminium salt, polymethines such as cyanine squaraine, croconaine; phthalocyanine, naphthalocyanine and quaterrylene-bisimide or in addition at least one inorganic IR absorber selected from lanthane hexaboride, indium tin oxide (ITO) antimony tin oxide such as Minatec 230 A-IR available from Merck, or Lazerflair® pigments available from Merck.

Further examples of organic IR absorbers are alkylated triphenyl phosphorothionates, for example as sold under the trade name Ciba® Irgalube® 211 or Carbon Black, for example as sold under the trade names Ciba® Microsol® Black 2B or Ciba® Microsol® Black C-E2. Examples of inorganic IR absorbers are oxides, hydroxides, sulfides, sulfates and phosphates of metals such as copper, bismuth, iron, nickel, tin, zinc, manganese, zirconium, tungsten, lanthanum, and antimony, including antimony(V) oxide doped mica and tin(IV) oxide doped mica.

A preferred are novel mixtures comprises tungsten trioxide ($WO_3$), a hydrogen comprising tungstate (e.g. $WO_3H_{0.53}$) and (metallic) tungsten. Said novel mixtures may be prepared by reducing ammonium paratungstate $[(NH_4)_{10}W_{12}H_2O_{42}.4H_2O$, sold by Osram Sylvania] in a plasma reactor at 5000-10000 K (Kelvin) with hydrogen. The thus obtained mixtures may contain about 25-70 parts by weight, especially 30-55 parts by weight, of a hydrogen tungsten bronze; 20-70 parts by weight, especially 30-60 parts by weight, of a binary tungsten oxide; and about 1-30 parts by weight, especially 2-20 parts by weight, of tungsten metal; examples are mixtures comprising 25-55% by weight of $WO_3H_{0.53}$, 35-60% of $WO_3$, and 3-35% of tungsten, it being understood that the sum of these three components is 100%, e.g. 35% of $WO_3H_{0.53}$, 56% of $WO_3$, and 9% of tungsten.

The following examples describe certain embodiments of this invention, but the invention is not limited thereto. It should be understood that numerous changes to the disclosed embodiments could be made in accordance with the disclosure herein without departing from the spirit or scope of the invention. These examples are therefore not meant to limit the scope of the invention. Rather, the scope of the invention is to be determined only by the appended claims and their equivalents. In these examples all parts given are by weight and the temperatures are given in degree Celsius unless otherwise indicated.

Abbreviations used:
NIR Near Infra Red radiation
SEM Scanning Electron Microscopy

1. PREPARATION 1.1 Ammonium tungstate powder was entrained into an argon gas stream by a standard vibratory powder feeder. The fluidized precursor was fed into a thermal plasma reactor. The temperature range typically reached in the plasma hot zone of the reactor is between 5000-10,000 K. The reactant vapor was cooled by a quench gas and the resulting powder was collected in a bag filter. A reducing plasma composition was achieved in order to produce an oxygen deficient tungsten oxide product denoted $WO_{3-x}$. The resulting powders were analyzed by powder X-ray diffraction, SEM, light scattering particle size analysis, and UV-VIS-NIR spectroscopy. Particle size is between 30 and 200 nm. This material (sample 0) exhibits very good dispersibility in coatings or plastics etc.

1.2 Ammonium paratungstate powder $((NH_4)_{10}W_{12}H_{2O}O_{42}\cdot 4H_2O$, Osram Sylvania) is entrained into an argon carrier gas by a vibratory-type powder feeder operating at 10 g/min. The fluidized powder is fed into a plasma reactor with a Tekna PL-50 plasma torch operated at a power of 65 kW. The temperature range typically reached in the plasma hot zone of the reactor is between 5000-10,000 K. A mixture of 100 slpm argon, and hydrogen/helium as indicated in the below table is used for the sheath gas:

| Sample No. | Sheath Gas (slpm) | | |
|---|---|---|---|
| | Ar | He | $H_2$ |
| 1 | 100 | 0 | 2 |
| 2 | 100 | 0 | 1.3 |
| 3 | 100 | 5 | 0.8 |
| 4 | 100 | 5 | 0.4 |
| 5 | 100 | 0 | 2 |

[slpm = standard liters per minute; standard conditions for the calculation of slpm are defined as: Tn 0° C. (32° F.), Pn = 1.01 bar (14.72 psi)].

The reactant vapor is cooled by a quench gas and the resulting powder is collected in a bag filter. The resulting powders are analyzed by powder X-ray diffraction, electron microscopy, and UV-vis-NIR spectroscopy.

2. X-RAY CHARACTERIZATION

The samples are slightly ground in an agate mortar for better particle homogenization and run on a standard Bragg-Brentano Siemens D5000 diffractometer system. A high-power Cu-target is used operating at 50 kV/35 mA. The data is collected in a step scan mode with step size 0.02° 2-theta and counting time of 1.5 seconds per step. The data processing is done by Diffrac Plus™ software Eva™ v. 8.0. The Rietveld analysis is carried out by Bruker's AXS Topas™ profile fitting software v. 2.1.

The obtained x-ray powder diffraction patterns are compared with reference patterns for available W and $WO_x$ materials in both PDF-2 Database and the calculated ones from the single crystal structural data provided in *Inorganic Crystal Structure Database*, 2005-2, Karlsruhe, Germany. The initial qualitative analysis reveals that all 4 analyzed samples are composed by 3 components mixed in different proportions: the cubic hydrogen tungsten oxide (bronze), $WO_3H_{0.53}$, the monoclinic and/or triclinic tungsten oxide, called in this study RT-$WO_3$, and a cubic, bcc, HT-tungsten, $W^i$. Each of the samples is found to consist of 3 phases, as shown in the following table 1. The relative percent of each phase is observed to be affected by the hydrogen in the sheath gas.

TABLE 1

Rietveld quantitative analysis of Tungsten/Tungsten Oxide mixtures.

| Sample ID | $WO_3H_{0.53}$ | WO3, P-1 | W | $R_{wp}$ | |
|---|---|---|---|---|---|
| 5 | 35.58 | 55.73 | 8.69 | 9.37 | |
| 4 | 38.99 | 55.70 | 5.31 | 9.29 | |
| 3 | 37.78 | 56.75 | 6.16 | 8.72 | |
| 2 | 50.03 | 37.79 | 12.18 | 10.66 | |
| 1 | 29.66 | 40.59 | 29.74 | 11.47 | contains impurity |

3. APPLICATION EXAMPLES

Sample Evaluation:

Samples containing solar control additives are evaluated using equipment as shown in FIG. 1. This instrument compares the temperature build up of a black aluminum panel behind two plastic samples (A4 size), one sample containing the solar controlling additive the other being a reference without any solar controlling additive. The two samples are mounted on the front side of two different chambers that are exposed to light of a 500 W halogen lamp with color temperature of 5000 K. temperature is recorded by thermocouples (PT100) in each chamber, connected to a PC data logger.

The resulting heat shielding factor (HS) after 800 seconds, expressed as $\Delta T_{800\ sec}$(° C.), is reported in the tables below.

3.1 Polycarbonate (PC) Injection Molding/PC Film Extrusion

Mixing and compounding: 3.0 kg of milled polycarbonate (Makrolon 3103) are dried in a vacuum oven at 120° C. for 8 hours. The powder is mixed with the additives (samples) listed in the below Table for 3 minutes at 80° C. in a 5 l Henschel Turbomixer, and then compounded on a Berstorff ZE 25x32D at 280° C. The polymer strand is granulated.

Sheet extrusion: The pellets are used to produce a 100 µm thick cast film (plate) on a Collin CR-136/350 sheet extrusion line at a maximum temperature of 280° C.

Evaluation: The ΔE values are measured in accordance with DIN 6174.

The UV-VIS-NIR Spectrum is recorded on a Shimadzu UV 3101 UV with ISR3100 integrating sphere: Parameter: Slit width 20, wavelength 250-1800 nm, Scan speed fast, Light Source change at 360 nm and Detector change at 830 nm.

The relative absorption is calculated by the absorption at the maximum divided by the initial absorption at the same wavelength.

Haze is measured on a Haze-gard plus from Byk Gardner in accordance with ASTM D-1003. The results are presented in Table 2.

TABLE 2

| | | | PC Film sample, Thickness 100 μm | | | |
|---|---|---|---|---|---|---|
| Sample ID | Conc. [%] | Initial Haze [%] | Trans-mittance [%] | $\Delta T_{800\,sec}$ (° C.) | TINUVIN 360 [%] | IRGAPHOS 168 [%] |
| 4 | 0.125 | 3.1 | 85.9 | 1.20 | 5 | 0.08 |
| 4 | 0.25 | 4.9 | 80.0 | 2.23 | 5 | 0.08 |
| 4 | 0.5 | 8.3 | 71.3 | 2.99 | 5 | 0.08 |
| Ref. | 0.0 | 0.4 | 91.9 | 0 | 5 | 0.08 |

Artificial weathering: The samples are irradiated in a Weather-Ometer Ci65 from ATLAS in accordance with ASTM G 155/ASTM G 151, Xenon lamp with 2 borosilicate filters, 0.35 W/m2 at 340 nm, 63±3° C. black panel temperature, 102 min dry and light, 18 min water spray and light.

The present PC compositions show good heat shielding and low haze and discoloration values.

3.2 Examples of PET-G Film Extrusion

Polyethylene terephthalate powder (PET-G; Eastar 6763 from Eastman) and 1% Tinuvin 1577 are turbo-mixed with the additives listed in the below Table in loading described in table 4, dried at 70° C. for 12 hours, then compounded in a twin screw Collin Extruder. The obtained pellets are dried again and extruded in a Collin cast line to get a 300 micron PET-G film.

TABLE 4

| Sample ID | Conc. [%] | $\Delta T_{800\,sec}$ (° C.) |
|---|---|---|
| 4 | 0.125 | 1.28 |
| 4 | 0.25 | 4.22 |
| 4 | 0.5 | |
| Reference | 0 | 0 |

The present PET compositions show a good heat shielding effect.

3.3 Examples of LDPE Films

LDPE powder (FF29 from Polimeri Europa) and 0.8% Tinuvin 371 are turbo-mixed with the additives in loading as described in table 5 and then compounded in a twin screw Collin Extruder. A 150-micron LDPE film is prepared by melt blow extrusion of the mixture using a FORMAC lab extruder.

TABLE 5

| Sample ID | Conc. [%] | $\Delta T_{800\,sec}$ (° C.) |
|---|---|---|
| 4 | 0.125 | |
| 4 | 0.25 | |
| 4 | 0.5 | |
| Reference | 0 | |

The present LDPE compositions show a good heat shielding effect.

3.4 Example for NIR Curing

The different IR-Absorbers are tested in a 2P-PU formulation concerning the temperature uptake during NIR-Curing as well as the final coating properties.

The IR-Absorbers are incorporated into the millbase using glassbeads and a scandex shaker for 16 h according to the following table (values are in g).

| Millbase | |
|---|---|
| Laropal A 81 (urea-aldehyde resin available from BASF) 60% in 1-methoxy-2propylacetate/xylene 3:1 | 15.7 g |
| EFKA 4401 (polymeric dispersant, available from Ciba Inc) | 0.08 g |
| 1-methoxy-2propylacetate (solvent) | 4.62 g |
| Butylglycolacetate (solvent) | 1.16 g |
| NIR-A | 0.19 g |

The millbase is mixed with the letdown formulation and the crosslinker is added according to the following table.

| LET DOWN | |
|---|---|
| Millbase | 21.75 |
| 2p PUR Clearcoat* | 3.84 |
| MPA/BGA (95/5) | 7.61 |
| Amount (g) | 33.20 |
| Desmodur N 3390 (90%) | 7.50 |

Desmodur N3390 is an aliphatic isocyanate available from Bayer Material Science and used as crosslinker

| *2p PUR Clearcoat: | |
|---|---|
| Macrynal SM 510n | 78.7 |
| EFKA ® 3030 | 0.15 |
| TINUVIN 292/TINUVIN 99-2 (65/35) | 2 |
| DBTL (10% in xylene) | 0.1 |
| DABCO-33LV (10% in xylene) | 0.1 |
| 1-methoxy-2-propylacetate | 14.45 |
| Butylglycolacetate | 4.5 |
| Sum | 100 |

Macrynal SM 510n is a hydroxyfunctional acrylic resin available from Cytec Surface Specialties EFKA 3030 is a modified polysiloxane to improve leveling available from Ciba Specialty Chemicals DBTL is Dibutyltin dilaurate and used as a catalyst DABCO-33LV is a mixture of triethylenediamine and dipropyleneglycol available from Air Products & Chemicals and used as catalyst The coating is applied by a wire bar using a WFT (wet film thickness) of 80 μm. The coatings are dried in an NIR-dryer using lamp settings and belt speeds as indicated below.

The distribution of the NIR-A into the coating formulation was checked via the measurement of haze over black. The lower the value the better the distribution in the formulation and the less impact on the visual film properties is observed.

| NIR Absorber | WFT (μm) | Wt % on solids | Haze |
|---|---|---|---|
| Sample 0 | 80 | 1 | 8.0 |
| Minatec ® 230 A-IR | 80 | 1 | 10.4 |
| Lazerflair ® 825 | 80 | 1 | 15.7 |

The temperature of the coating surface is measured directly after cure.

The Table below shows the results using a belt speed of 2 m/min, a 6 Adphos high-burn NIR-lamps, output 70%, a distance to the lamp of 100 mm

| NIR absorber | Wt % on solid | Temp. after Curing (° C.) |
| --- | --- | --- |
| Blanc (no NIR absorber) | — | 98 |
| Minatec 230 A-IR | 1 | 106 |
| Lazerflair 825 | 1 | 112 |
| Sample 0 | 1 | 216 |

The present powder composition may be incorporated with low haze and provides good conversion of NIR radiation into heat.

3.5 Example Laser Welding

The IR absorber according to example 1.1 is incorporated by means of an injection molding machine into a polycarbonate sheet (thickness 2 mm) at a concentration of 500 ppm. The resulting (transparent and slightly bluish) sheet is welded together with a polycarbonate sheet (thickness 1 mm) using a 250 watt Nd:YAG-laser. The surface is scanned by laser beam at a speed of 20 mm/sec.

The resulting welding has an excellent connection, is highly transparent, does not show any localized plastic deformation, does not evolve bubbles during welding.

No fracture of the joining line is induced due to mechanical stress.

3.6 White Gravure Ink

A titanium dioxide based white ink that has excellent photosensitivity to laser imaging at 1064 nm is prepared in the following manner:

| Formulation of the ink | |
| --- | --- |
| Components | % by weight |
| C501 Varnish | 54.9 |
| A-HR Anatase TiO2 | 45.0 |
| powder comp. of sample 5 | 0.1 |

The C501 Varnish is prepared by mixing together Vinnapas® C501 resin manufactured by Wacker Chemie AG, a solid copolymer of vinyl acetate and crotonic acid with an acid number of 7.5 mg KOH/g, a molecular weight of 170 000 g/mol and a Tg of ca. 43° C., (20 parts) and propyl acetate (80 parts).

The ink thus obtained, containing as IR absorber 0.1% of a mixture consisting of $WO_3H_{0.53}$, $WO_3$ and W (hereinafter designated as ink Z) is compared to the analogous ink not comprising said absorbers (hereinafter designated as ink X).

Each of said inks X and Z is applied to white packaging board using a standard K2 bar and dried. Then a 1 cm square area of each of the obtained packaging boards is lasered (fill 60, 1500 mms, 20 Khz). The optical density of the imaged areas are then measured along with the background whiteness. As can be seen from the table below, a good image density is observed with only 0.1% of the present ink (ink Z), and also the CIE whiteness of the unimaged area remains high at 99.15.

| Ink | IR Absorber | Image Density | Background Whiteness (CIE) |
| --- | --- | --- | --- |
| X | none | 0.37 | 99.54 |
| Z | sample 5 (0.1%) | 0.62 | 99.15 |

BRIEF DESCRIPTION OF FIGURES

FIG. 1 shows the evaluation equipment layout.

The invention claimed is:

1. Powder composition comprising
    a) 25-70 parts by weight, of a hydrogen tungsten bronze of formula $WO_{3-z}H_x$, where x ranges from 0.2 to 1 and z ranges from 0 to x,
    b) 20-70 parts by weight of a binary tungsten oxide and
    c) 1-30 parts by weight of tungsten metal.

2. Composition of claim 1 comprising
    a) 30-55 parts by weight, of a hydrogen tungsten bronze of the formula $WO_{3-z}H_x$, where x ranges from 0.4 to 0.7 and z ranges from 0 to x,
    b) 30-60 parts by weight, of the binary tungsten oxide and
    c) 2-20 parts by weight, of tungsten metal.

3. Composition of claim 1 wherein a major fraction of the hydrogen tungsten bronze is of cubic crystal structure, space group Im-3.

4. Composition of claim 1 wherein components (a)-(c) make up 95-100% b.w. of the total powder composition, the remainders, if any, being organic polymers, other tungsten compounds and/or water.

5. Composition of claim 1 wherein the binary tungsten oxide is $WO_{3-y}$, where y ranges from 0 to 1.

6. Process for the preparation of a composition according to claim 1, which process comprises contacting ammonium tungstate with hydrogen and/or a hydrogen releasing gas at a temperature of 2500 K or more.

7. Process of claim 6, wherein the contact is effected in a plasma.

8. Process of claim 6, wherein hydrogen and/or hydrogen releasing gas is used in mixture with a noble gas.

9. Process of claim 8, wherein the amount of hydrogen is adjusted to keep the amount of tungsten metal formed in the product in the range 3-20% b.w. of the product.

10. Particle dispersion comprising hydrogen tungsten bronze particles in combination with particles of binary tungsten oxide and those of tungsten metal, in a weight ratio as defined in claim 1, in a dispersing medium selected from organic polymers, organic solvents, water, combinations of organic solvents and water, combinations of organic polymers and organic solvents and combinations of organic polymers and water.

11. Particle dispersion of claim 10, wherein 90% by weight or more of the total particle mass consists of particles from the size range 1 nm to 800 nm.

12. Composition comprising
    a) a synthetic thermoplastic organic polymer or a coating binder and
    b) 0.01 to 15% b.w., based on component a), of a powder composition according to claim 1.

13. Composition of claim 12 containing a hydrogen tungsten bronze of cubic crystal structure.

14. Composition of claim 12 containing component b) in the form of particles dispersed in the matrix of component a).

* * * * *